US006323840B1

(12) United States Patent
Steinbrunner

(10) Patent No.: US 6,323,840 B1
(45) Date of Patent: Nov. 27, 2001

(54) SURFACE-MOUNT POINTING DEVICE

(75) Inventor: Steven L. Steinbrunner, Mercer, OH (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 09/397,796

(22) Filed: Sep. 17, 1999

(51) Int. Cl.[7] ............................................... G09G 5/08
(52) U.S. Cl. ..................... 345/161; 345/156; 345/168
(58) Field of Search ................................... 345/156, 157, 345/161, 168, 160

(56) References Cited

U.S. PATENT DOCUMENTS

| Re. 035,016 | | 8/1995 | Gullman . | |
|---|---|---|---|---|
| 4,876,524 | | 10/1989 | Jenkins . | |
| 4,905,523 | | 3/1990 | Okada . | |
| 5,263,375 | | 11/1993 | Okada . | |
| 5,325,081 | | 6/1994 | Roberts . | |
| 5,489,900 | | 2/1996 | Cali . | |
| 5,579,033 | * | 11/1996 | Rutledge et al. ..................... | 345/161 |
| 5,659,334 | | 8/1997 | Yaniger . | |
| 5,689,285 | * | 11/1997 | Asher ................................... | 345/161 |
| 5,712,660 | | 1/1998 | Martin . | |
| 5,754,166 | | 5/1998 | Baba . | |
| 5,754,167 | | 5/1998 | Narusawa . | |
| 5,872,320 | * | 2/1999 | Kamentser et al. ............. | 73/862.044 |
| 5,894,301 | * | 4/1999 | Seffernick ............................ | 345/160 |
| 5,912,612 | * | 6/1999 | DeVolpi ................................. | 338/95 |
| 6,002,388 | * | 12/1999 | Seffernick et al. .................. | 345/161 |
| 6,017,993 | * | 1/2000 | Maeda et al. ......................... | 524/497 |
| 6,121,954 | * | 9/2000 | Seffernick ............................ | 345/161 |
| 6,137,475 | * | 10/2000 | Ginn et al. ............................ | 345/161 |
| 6,195,082 | * | 2/2001 | May et al. ............................ | 345/161 |
| 6,236,034 | * | 5/2001 | DeVolpi ................................ | 250/221 |
| 6,256,012 | * | 7/2001 | DeVolpi ................................ | 345/161 |

* cited by examiner

Primary Examiner—Bipin Shalwala
Assistant Examiner—Ricardo Osorio
(74) Attorney, Agent, or Firm—Mark P. Bourgeois; Mark W. Borgman

(57) ABSTRACT

A surface-mount pointing device controls the movement of an object on a display screen. The device has a base and a shaft. The shaft is mounted to the base. Several sensors are mounted on the base and around the shaft for sensing the amount of strain in the base that is created in response to a force applied on the shaft by a user. Conductors are mounted on the base and electrically connected to the sensors. Electrical leads are electrically and mechanically connected to the conductors. The electrical leads are shaped for mounting on the surface of a circuit board. The electrical leads each have a bifurcated inner terminal end that is electrically connected to the conductors. The bifurcated inner terminal end fits over and grips an edge of the base. An outer terminal end extends outwardly of the base and is shaped for mounting on the surface of a circuit board.

14 Claims, 6 Drawing Sheets

SURFACE-MOUNT POINTING DEVICE

CROSS REFERENCE TO RELATED APPLICATIONS

The following applications are herein incorporated by reference for supportive and related teachings:

U.S. patent application Ser. No. 09/258,513, filed Mar. 30, 1999 is an integrated surface mount pointing device and has the same assignee as the present invention.

U.S. patent application Ser. No. 08/717,517, filed Sep. 23, 1996 is a collar mounted pointing stick and has the same assignee as the present invention.

U.S. patent application Ser. No. 08/756,202, filed Nov. 25, 1996 is a pointing stick with z-axis actuation and has the same assignee as the present invention.

U.S. patent application Ser. No. 08/938,274, filed Sep. 26, 1997 is a unified bodied z-axis pointing stick and has the same assignee as the present invention.

U.S. patent application Ser. No. 08/794,703, filed Feb. 4, 1997 is a z-axis pointing stick with ESD protection and has the same assignee as the present invention.

U.S. patent application identified by docket number CTS-1675 filed May 21, 1997 is a pointing stick having an interposer connecting layer and has the same assignee as the present invention.

BACKGROUND OF THE INVENTION

1. Field of the Invention

This invention generally relates to a pointing device for controlling the positioning, movement and operation of a cursor on a display screen associated with a computer and, more particularly, to an integrated pointing device that is mountable to a printed circuit board.

2. Description of the Related Art

Various devices are well known for controlling cursor movement over a display screen associated with a computer. Depending on the type of computer program in operation, the position of the cursor on a display screen may indicate a choice of computer commands on a menu associated with the computer program displayed on the display screen menu. One such device is a "mouse" which has a ball mounted to its underside for contacting a horizontal surface and rolling therealong when manipulated by a computer operator. The X- and Y-axis components of movement are sensed and transmitted through a connecting cable to a serial input port of the computer. This signal to the computer is varied by the amount and direction of mouse ball movement, and causes a corresponding movement of the cursor on the display screen. Typically a pair of "mouse" or "click" buttons are located on the top of the mouse at the forward end thereof. The buttons permit a computer operator to enter a selection or other command to the computer (the command typically being shown by the position of the cursor on the displayed menu) upon pressing one or the other or both buttons, depending upon the software associated with the mouse. Such a device, which is separate from the computer console and keyboard, requires a connection to a computer port and a flat, horizontal supporting surface for proper operation. Furthermore, the computer operator must completely remove one hand from the computer keyboard in order to move the mouse and thus the cursor on the display screen and then reposition the hand again over the keys of the keyboard to resume data entry.

Another cursor controlling and signaling mechanism is a "joystick" which, like the mouse, is completely separated from the computer console and keyboard. The joystick is typically an elongated, upright stick that extends upwardly from a base connected to the computer console by means of an electrical cable. The joystick is operated by tilting the upright stick in various directions to cause the cursor or other display element to move on the display screen in a direction and usually at a speed corresponding to the direction and pressure exerted on the stick by the computer operator. The operation of a joystick, however, frequently requires that both hands be moved from the computer keyboard, with one hand holding the base and the other hand manipulating the joystick. A "click" button is usually located on the joystick. Although a mouse or joystick can be used with a portable "laptop" or "notebook" sized computer, such devices are cumbersome, since they must be carried separately and connected to the computer before use. Moreover, such devices are not suitable for operation during travel.

A "trackball" is still another type of known cursor controlling device. This device, which in essence is an inverted mouse, includes a rotatable ball mounted within a housing. The ball is rotated by a finger, thumb or palm of the computer operator, and the X- and Y-components of movement are sensed and input into the computer with corresponding movement of the cursor across the display screen. "Mouse" or "click" buttons are usually located on the trackball housing, although with some models a selection signal is input by pressing the "enter" key on the standard keyboard. This type of pointing device has been somewhat useful with portable computers because it can be temporarily affixed to one side of the computer case for manipulation by one hand of the computer operator. However, although trackball devices can be removably mounted to the computer case, they still required attachment before use and removal after use and repositioning of the computer operator's hand during use. It is also noted that some trackball's are built into the computer keyboard. Nonetheless, these trackball's required a separate set of "click" buttons for selection of items on the display monitor.

Manufacturers of portable laptop computers, recognizing the need for placing the cursor controlling device in a permanent and more convenient location, have more recently installed a small, stubby button-like joystick at a central position on the computer keyboard, such as at the juncture of the "g," "h" and "b" keys of the standard "QWERTY" keyboard. The button-like joystick, also known as a pointing stick, is sensitive to lateral pressure, the amount and direction of which are sensed and input into the computer to cause movement of the cursor, with the speed and direction of cursor movement corresponding to the amount and direction of pressure on the pointing stick. In order to select items on the display screen, upwardly extending "mouse" or "click" buttons must be provided somewhere on the computer, typically at a location remote from the pointing stick. This, as with the previously described cursor control devices, is disadvantageous since the hand and fingers of the computer operator must be repositioned in order to actuate the buttons and then be moved again to the proper keyboard position for typing.

Another disadvantage associated with a keyboard-mounted pointing stick is that a communication cable must extend from the pointing stick to a circuit board that provides a power source, amplifiers, and calibration electronics for the pointing stick. The circuit board is spaced from the pointing stick and care must be exercised when installing the cable therebetween. Moreover, the materials that make up the cable, its process of forming and method of attachment to the pointing stick contribute to increased overall cost of the pointing stick.

Examples of patents related to the present invention are as follows, wherein each patent is herein incorporated by reference for related and supporting teachings:

U.S. Pat. No. Re. 35,016 discloses a three-axis force measurement stylus.

U.S. Pat. No. 5,754,167 discloses a coordinate input device for a computer keyboard, wherein signals from the input device are transmitted to a separate control section by way of a flexible cable.

U.S. Pat. No. 5,754,166 discloses a coordinate input device for a computer keyboard. The input device has a pointing stick with heat-shrinkable tubing installed therearound for affixing strain sensors on the side surfaces of the pointing stick.

U.S. Pat. No. 5,712,660 discloses a cursor control stick for mounting in a computer keyboard. The control stick has a slidable plunger for generating Z-axis signals for selection of an item on a computer screen.

U.S. Pat. No. 5,659,334 discloses a pointing stick with a concave lower surface that rides on a force-sensing resistor network for sensing direction of pointing stick tilt.

U.S. Pat. No. 5,489,900 discloses a force sensitive transducer for use in a computer keyboard.

U.S. Pat. No. 5,325,081 discloses a supported strain gauge and joy stick assembly and method of making.

U.S. Pat. No. 5,263,375 discloses a contact detector using resistance elements and its application.

U.S. Pat. No. 4,905,523 discloses a force detector and moment detector using resistance elements.

U.S. Pat. No. 4,876,524 discloses an isometric control device or the like of the type having an elastic beam and strain gauges attached to the surface of the beam characterized by at least a first group of three strain gages each having an operative axis thereof inclined with a single predetermined angle with respect to the main axis of the beam, and the strain gauges disposed at a first predetermined level along the beam.

The foregoing patents reflect the state of the art of which the applicant is aware and are tendered with the view toward discharging applicants' acknowledged duty of candor in disclosing information that may be pertinent in the examination of this application. It is expressly stipulated, however, that none of these patents teach or render obvious, singly or when considered in combination, applicants' claimed invention.

SUMMARY OF THE INVENTION

It is a feature of the present invention to provide a pointing stick for controlling cursor movement on a display screen of a computer system.

It is a further feature of the present invention is to provide a pointing stick device for controlling cursor movement on a display screen of a computer system that is mountable to a surface of a circuit board.

Another feature of the present invention is to provide a surface-mount pointing device for controlling the movement of an object on a display screen. The device includes a base and a shaft having a first end and a second end. The first end is mounted to the base. Several sensors are mounted on the base and around the shaft for sensing the amount of strain in the base that is created in response to an applied force on the shaft in at least a first direction. Several conductors are mounted on the base and electrically connected to the sensors. Several electrical leads are electrically connected to the conductors. The electrical leads are shaped for mounting on the surface of a circuit board. The electrical leads each have a bifurcated inner terminal end that is electrically connected to the conductors. The bifurcated inner terminal end fitting over and gripping an edge of the base. An outer terminal end extends outwardly of the base and is shaped for mounting on the surface of a circuit board.

There has thus been outlined the more important features of the invention so that the detailed description thereof that follows may be better understood, and so that the present contribution to the art may be better appreciated. There are, of course, additional features of the invention that will be described hereinafter which will form the subject matter of the appended claims. Those skilled in the art will appreciate that the preferred embodiment may readily be used as of basis for designing other structures, methods and systems for carrying out the several purposes of the present invention. It is important, therefore, that the claims are regarded as including such equivalent constructions since they do not depart from the spirit and scope of the present invention.

It is noted that the drawings of the invention may not necessarily be to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the accompanying drawings.

DETAILED DESCRIPTION OF THE PREFERRED EMBODIMENTS

Figure 1:
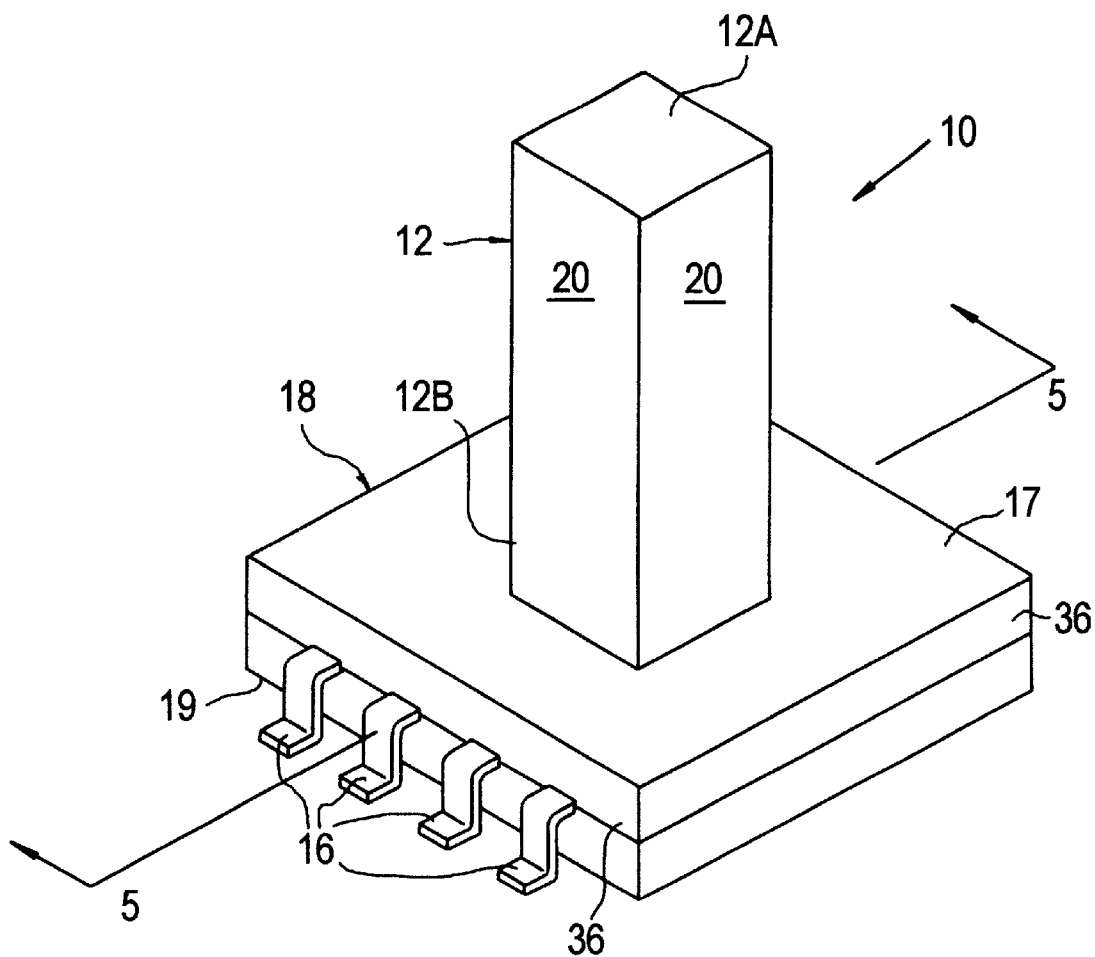
FIG. 1 is an isometric view of a surface-mount pointing device according to the preferred embodiment of the invention.
Figure 3:
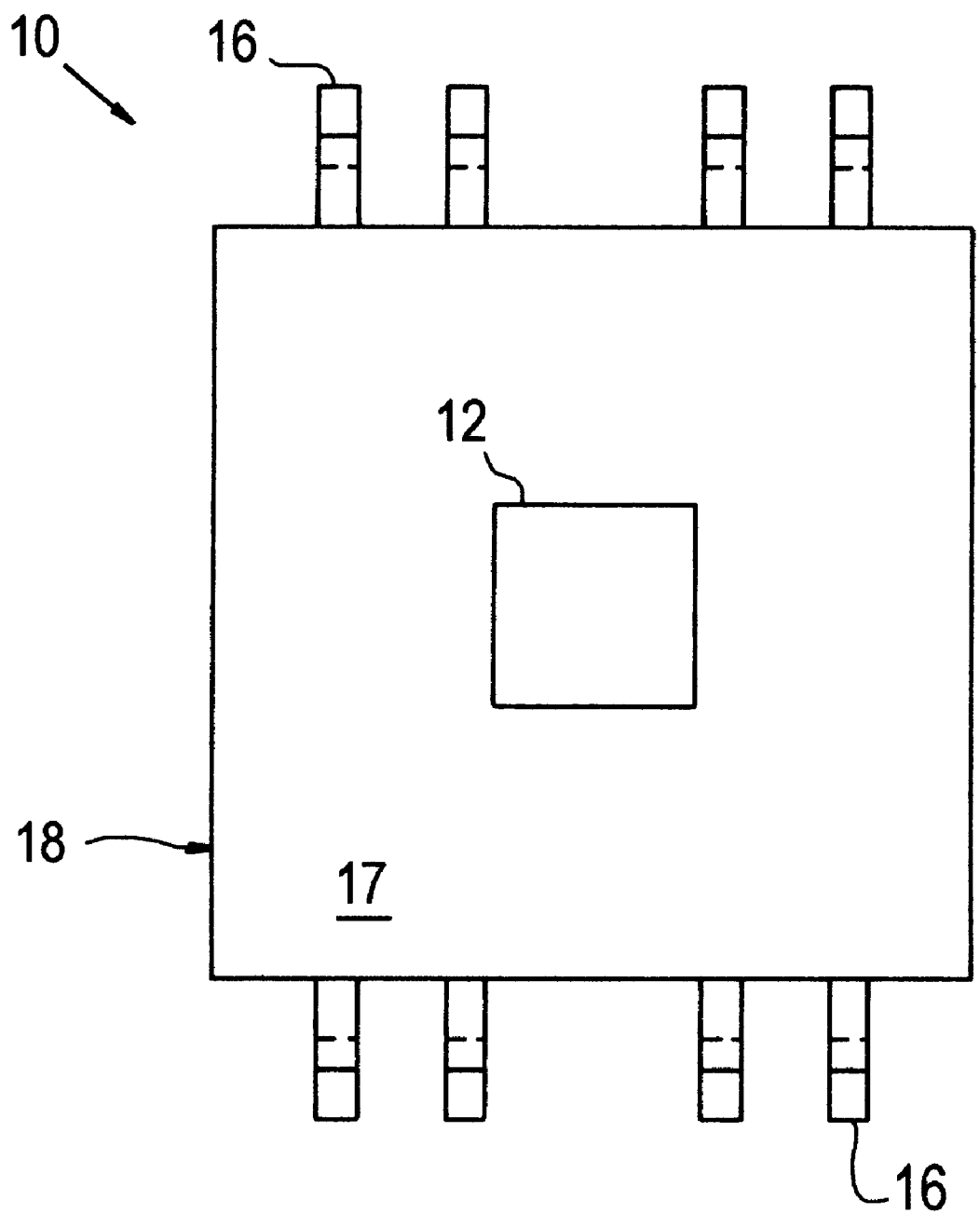
FIG. 3 is a top view of FIG. 1.

With reference now to the drawings, and to FIGS. 1 and 3 in particular, a surface-mount pointing device 10 that can be used to control the movement of a cursor on a computer screen (not shown) is illustrated. In particular, the pointing device 10 comprises an upright pointing stick or shaft 12 that has a first end 12A, second end 12B and sides 20. Outer terminal ends 16 fit into an overmolded cover 18. Cover 18 supports the stick 12 and the outer terminal ends 16. Cover 18 has a top surface 17, a bottom surface 19 and side surfaces 36.

Figure 2:
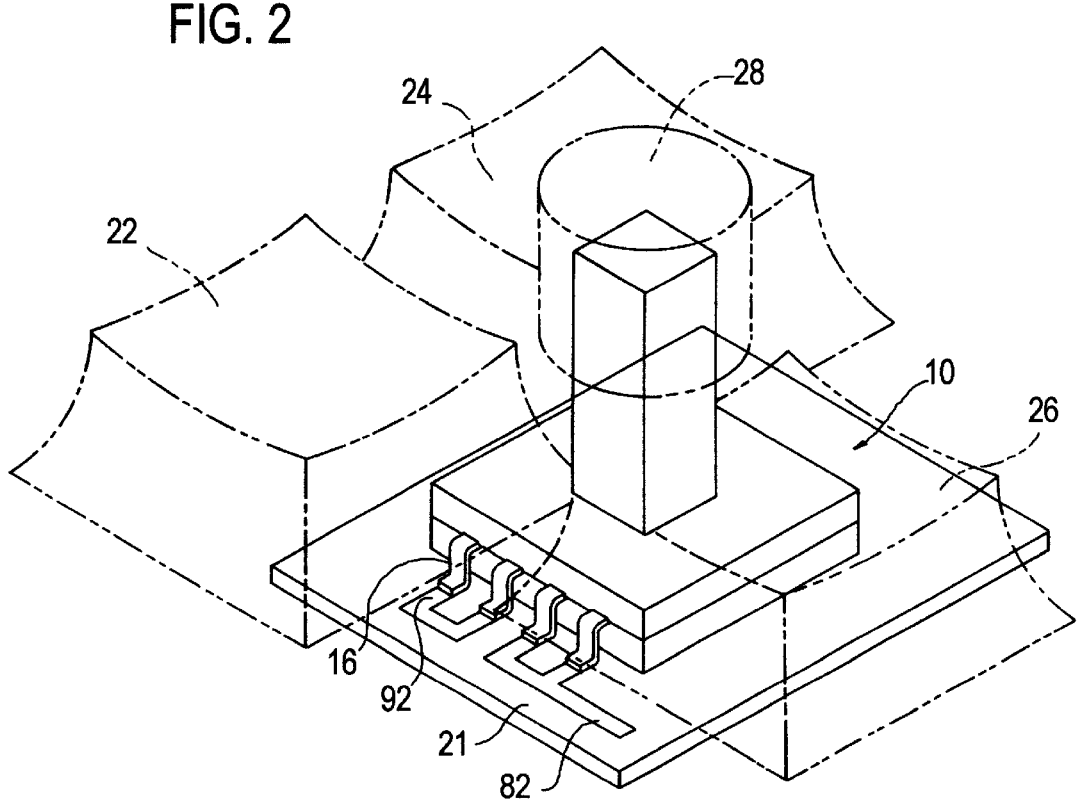
FIG. 2 is an isometric view of the surface-mount pointing device of FIG. 1 mounted in a keyboard.

As shown in FIG. 2, the pointing device 10 is surface-mounted on a printed circuit board 21 using well-known techniques. Terminal ends 16 are mounted on a surface mount pad 92 which in turn is connected to circuit lines 82. The circuit board 21 is in turn installed in a typing keyboard having a plurality of keys, such as keys 22, 24 and 26 (shown in phantom line) representative of letters, numerals, and/or symbols. Preferably, the keyboard is of the standard "QWERTY" type and the circuit board is mounted in the keyboard at a location such that the pointing stick 12 is positioned at the juncture between the "G" key 22, the "H" key 24, and the "B" key 26. Although this is the preferred location for the stick 12, it is to be understood that the pointing device 10 can be mounted at other locations, either on or off the keyboard. A resilient cap 28 (shown in phantom line), which may be formed of rubber-like material, is positioned over the top of stick 12 to increase the ease of operating the stick. The cap is sized to receive a single finger of an operator for controlling cursor movement on a computer screen in response to pressure exerted against the cap (and consequently the stick 12) in a desired cursor direction.

Referring again to FIGS. 1 and 2, the pointing stick 12 may be is preferably constructed of electrically insulative material, such as a ceramic or plastic. In the embodiment illustrated, the stick 12 is substantially square in cross section, although it could be round. Stick 12 is attached to base 50 by an epoxy.

Figure 4:
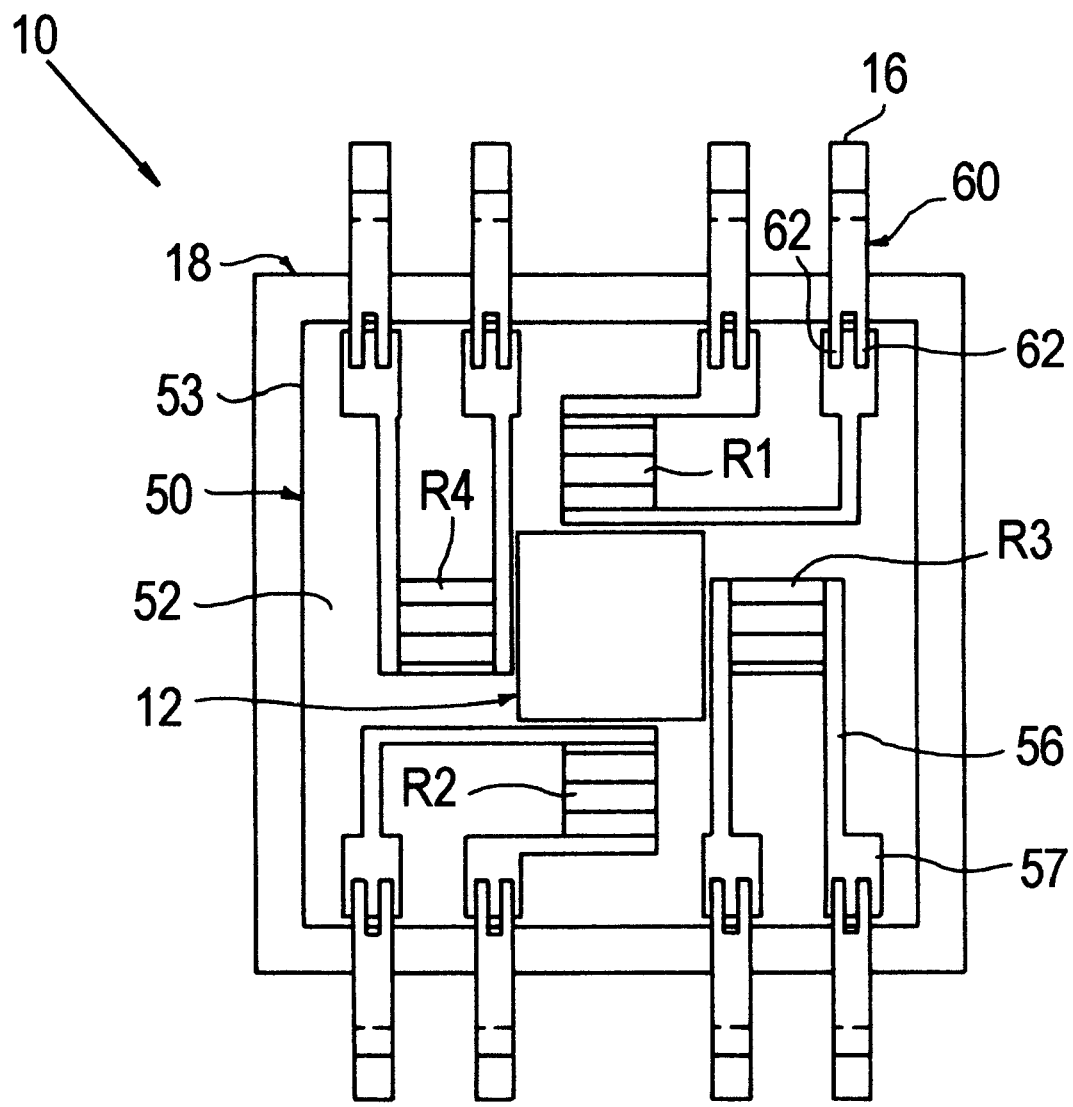
FIG. 4 is a top view of FIG. 1 with the top half of the molded cover and the solder removed.
Figure 5:
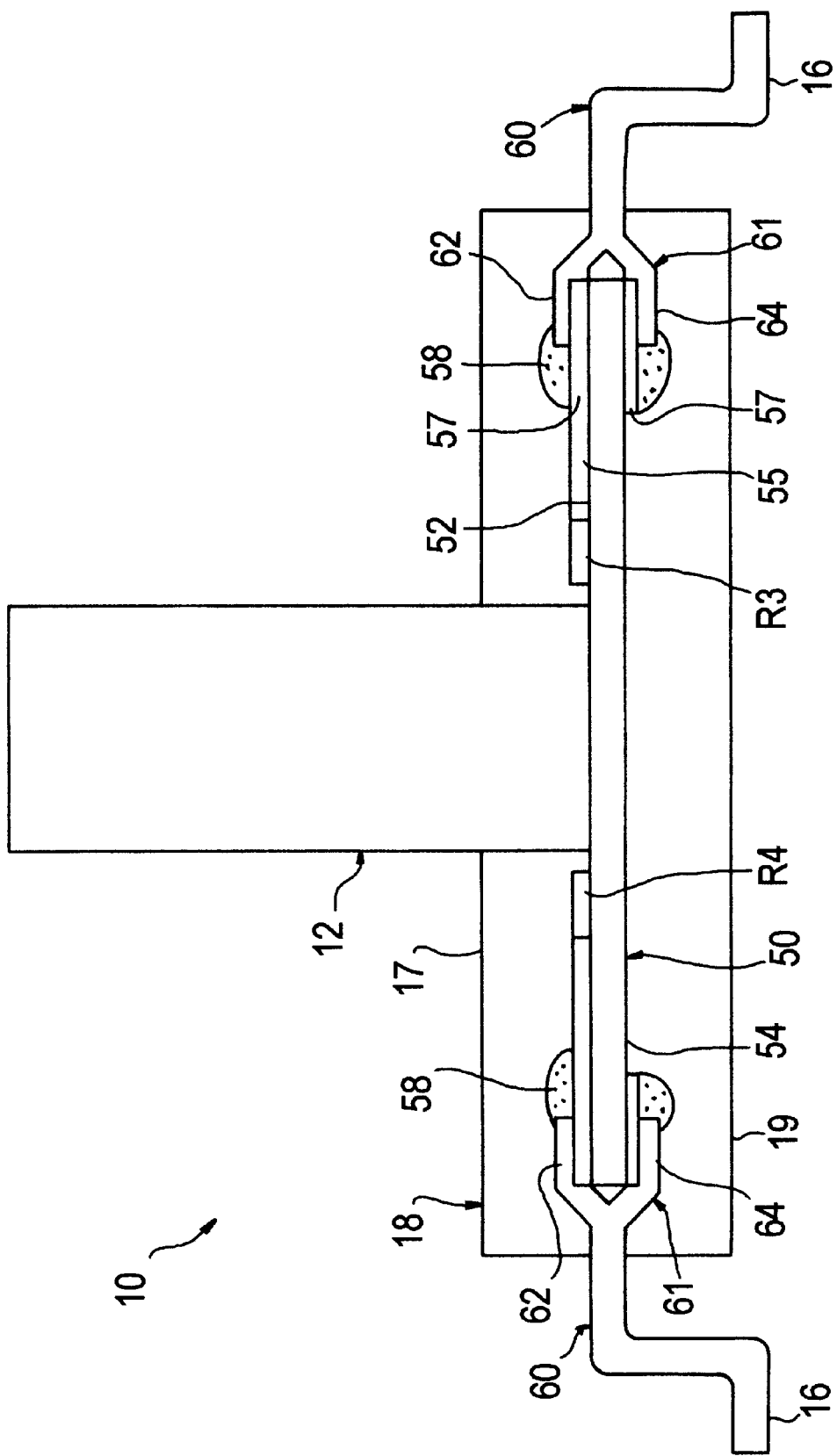
FIG. 5 is a cross sectional view of FIG. 1 along section line 5—5.

With additional reference to FIGS. 4 and 5, the outer terminal ends 16 are formed on an electrical lead 60. Each lead 60 has an outer terminal ends 16 and a bifurcated inner terminal end 61. Each of the bifurcated inner terminal ends 61 has a pair of upper ends 62 and a lower end 64. Upper and lower ends 62 and 64 fit over and firmly grip base 50. Preferably, eight leads 60 are arranged on opposite sides 36. If desired, leads 60 could be arranged on all four sides 36 of the body 18 such that four outer terminals 16 project outwardly and downwardly from each side. Arrangement of the leads 60 in this fashion offers several advantages. Since only the outer terminals 16 are in contact with the printed circuit board (PCB), the number of outer terminals 16 is related to the holding strength of the device 10 on the PCB. A larger number of outer terminals permits increased holding strength than if fewer terminals are used. Consequently, greater resistance to separation of the pointing device 10 from the PCB is realized, especially during operation of the pointing stick 12 where forces may be generated in the X, Y and Z axes, or any combination thereof The symmetrical orientation of the outer terminals 16 contributes to symmetrical loading along these axes when the pointing stick 12 is operated and facilitates alignment of the pointing device 10 with the printed circuit board during the mounting operation. The leads may initially be pre-formed in their proper orientation as part of a lead frame (not shown) for facilitating automatic assembly of the pointing device 10. Although four outer terminals 16 are shown on two sides 36 of the body 18, more or less outer terminals may be formed. Leads 60 would be formed from conventional electrical lead materials such as phosphor-bronze that is nickel plated and then solder plated.

The outer terminals 16 of the leads 60 are shown in FIG. 5 with a gull-wing shape, but may be formed into any shape so as to be attachable to a printed circuit board, including, but not limited to J-lead, thru-hole and butt terminal shapes.

A substrate or base 50 has an upper surface 52 and a lower surface 54 and side surfaces 53. Upper and lower ends 62 and 64 fit over and firmly grip base 50. Four strain sensitive resistors R1, R2, R3, and R4 are arranged surrounding stick 12 on surface 52 of base 50. Resistors R1–R4 function as a force sensor. Electrically connected to each end of resistors R1–R4 are conductor lines 56. Each conductor 56 line terminates in a conductor pad 57 near side surface 53. Conductor lines 56 and pads 57 are located on surface 52 of base 50. Conductor pads 57 are also located on lower surface 52 of base 50. On the lower surface, conductor lines 56 are absent. Base 50 is preferably constructed of conventional alumina ceramic.

Resistors R1–R4 are formed of a material that exhibits a change in electrical properties, such as resistance, in response to the amount of strain applied thereto. Preferably, a conventional resistive thick film material is screened onto the base 50 using conventional thick film screening techniques. Alternatively, a resistive thin film material can be sputtered onto base 50. The conductor lines 56 and pads 57 are similarly formed of conventional thick film materials using conventional thick film screening techniques. The strain sensitive resistors R1–R4 may be laser trimmed if desired to increase accuracy.

Upper and lower ends 62 and 64 of bifurcated inner end 61 fit over and firmly grip base 50. Ends 62 slides over and contacts with conductor pad 57. End 64 contacts lower surface 54. Solder joints 58 electrically connect conductor pads 57 to upper end 62 and lower end 64.

Cover 18 is formed from an overmolded thermoplastic or thermo-set epoxy. During manufacturing the base 50, leads 60 and stick 12 would be inserted into a mold and liquid plastic injected into the mold, then cooled to form cover 18.

Figure 6:
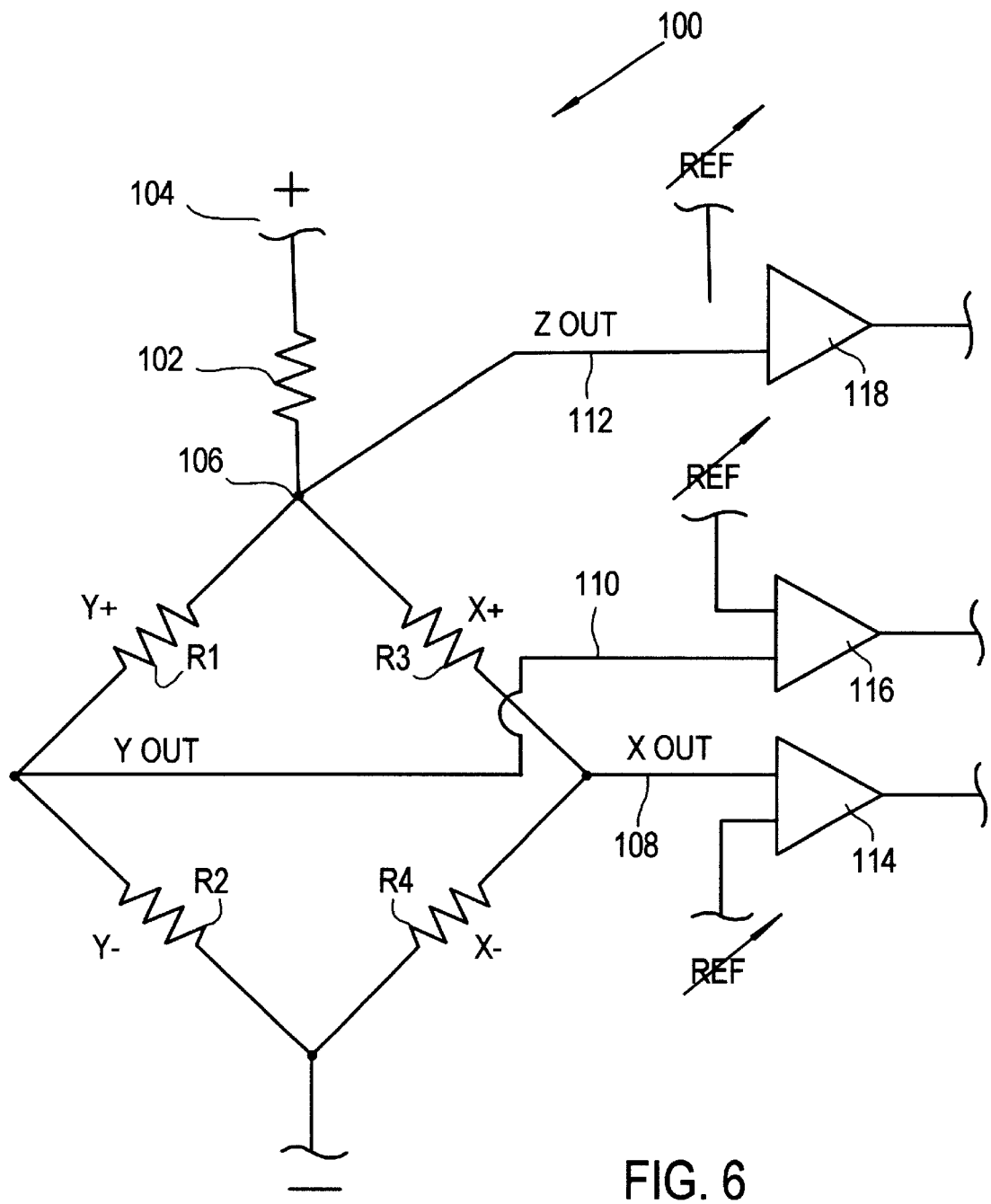
FIG. 6 is an electrical schematic of a bridge circuit using the surface mount pointing device of FIG. 1.

Referring now to FIG. 6, an electrical schematic 100 of a bridge circuit incorporating the resistors R1–R4 is shown. Specifically, this circuit is an example of how the pointing stick 10 can be arranged to interface with the electronics (not shown) on the circuit board 21. The resistors on opposite sides of the stick 12 are configured in two half bridge circuits, resistors R1 (Y+) and R2 (Y–) form a first half bridge, while resistors R3 (X+) and R4 (X–) form the second half bridge. A fixed resistor 102 is connected between the supply voltage 104 of the system and a node 106. The X OUT output 108, Y OUT output 110, and Z OUT output 112 are amplified by three differential amplifiers 114, 116, and 118, respectively. Each amplifier has a variable reference voltage input. These reference voltages are calibrated to set the output to zero along each axis when no force is applied to the stick 12. The X and Y axis outputs 116 and 118 are developed when an X or Y directional force is applied to the stick 12. For example, when a force is applied in the X direction, the X– and X+ strain sensitive resistors R3, R4 change resistance in opposite directions and cause an output change. The same is true for the Y-axis. A Z-axis output is developed when a Z-axis force is applied to the top of the stick 12. Force in the Z-axis causes all strain gauge resistors R1–R4 to change in a negative direction. This change lowers the total impedance of the two half bridges. The lower bridge impedance causes a voltage change in the Z OUT output 112 since the series resistor 102 is fixed.

Remarks About the Preferred Embodiments

One of ordinary skill in the arts of strain gages and ceramic materials, and more particularly the art of designing pointing sticks, will realize many advantages from using the preferred embodiment. In particular, strain gages are devices that sense the amount and direction of applied pressure placed upon the pointing stick. The sensed pressure creates electrical output signals used to direct the cursor on a display device.

A skilled artisan would realize that the pointing device 10 is now capable of performing selection and dragging of icons on a monitor in addition to double clicking for selection of an item. In this operation, the user would hold down the pointing stick 12 while exerting additional force in the X-Y plane for controlling the direction of the icon being dragged. All of these functions are now capable of being performed with a single finger while the remaining fingers are located on the keyboard.

A skilled artisan would realize that the pressure fitting of lead 60 over base 50 and then soldering allows for a simple manufacturing technique that is repeatable and able to hold close registration tolerances during assembly.

The above-described embodiments can be constructed with the same dimensions and lead pitches as standard commercially available IC packages and has all of the advantages associated with surface mount printed circuit board assembly. The compact size would allow for its use in a wide variety of applications, while the minimal parts and ease of assembly of the above-described embodiments also renders the device relatively inexpensive to produce.

VARIATIONS OF THE PREFERRED EMBODIMENTS

One of ordinary skill in the art of making pointing devices will realize that there are many different ways of accomplishing the preferred embodiment. For example, although the electrical leads 60 were shown on two sides of the device, leads on 4 sides could be used. Further, electrical leads 60 were shown as having a bifurcated end 61, if desired the bifurcated end 61 could be omitted and soldered to conductor pad 57. Also, leads 60 could be wire bonded to condutor pads 57.

Although base 50 was shown to be made of ceramic, it is contemplated to make base 50 from a printed circuit board material such as FR4 and to use polymer strain gage resistors or discrete strain gage chip resistors.

It is to be understood that the X, Y, and Z axes, as well as the terms upper, lower, etc., and their respective derivatives as used herein are intended to describe relative, rather than absolute directions and/or positions.

While the invention has been taught with specific reference to these embodiments, someone skilled in the art will recognize that changes can be made in form and detail without departing from the spirit and the scope of the invention. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The embodiments for which an exclusive property or privilege is claimed are defined as follows:

1. A surface-mount pointing device for controlling the movement of an object on a display screen, comprising:
    a) abase;
    b) a shaft mounted to the base;
    c) a plurality of sensors mounted on the base and around the shaft for sensing the amount of strain in the base that is created in response to an applied force on the shaft in at least a first direction;
    d) a plurality of conductors mounted on the base and electrically connected to the sensors; and
    e) a plurality of electrical leads electrically connected to the conductors, the electrical leads being shaped for mounting on the surface of a circuit board, the electrical leads each further comprising an inner terminal end, electrically and mechanically connected to the conductors, the inner terminal end fitting over and gripping an edge of the base and an outer terminal end extending outwardly of the base and being shaped for mounting on the surface of a circuit board.

2. A surface-mount pointing device according to claim 1, wherein the inner terminal end is bifurcated.

3. A surface-mount pointing device according to claim 2, wherein the inner terminal end is attached to the conductors by a solder joint.

4. A surface-mount pointing device according to claim 1, wherein the shape of the outer terminal ends is selected from the group consisting of:
    f) gull-wing;
    g) J-lead; or
    h) butt terminal shapes.

5. A surface-mount pointing device according to claim 1, wherein the sensors are strain sensitive resistors.

6. A surface-mount pointing device according to claim 5, wherein the base is ceramic.

7. A surface-mount pointing device according to claim 5, wherein the base is a printed circuit board.

8. A surface-mount pointing device for controlling the movement of an object on a display screen, comprising:
    a) abase;
    b) a shaft mounted to the base;
    c) a plurality of strain sensitive resistors mounted on the base and around the shaft, for sensing the amount of strain in the base that is created in response to an applied force on the shaft in at least a first direction;
    d) a plurality of conductors mounted on the base and electrically connected to the strain sensitive resistors; and
    e) a plurality of electrical leads electrically connected to the conductors, the electrical leads being shaped for mounting on the surface of a circuit board, the electrical leads each further comprising an inner terminal end, electrically and mechanically connected to the conductors, the inner terminal end fitting over and gripping an edge of the base and an outer terminal end extending outwardly of the base and being shaped for mounting on the surface of a circuit board.

9. A surface-mount pointing device according to claim 8, wherein the inner terminal end is bifurcated.

10. A surface-mount pointing device according to claim 9, wherein the inner terminal end is attached to the conductors by a solder joint.

11. A surface-mount pointing device according to claim 8, wherein the shape of the outer terminal ends is selected from the group consisting of:
    f) gull-wing;
    g) J-lead; or
    h) butt terminal shapes.

12. A surface-mount pointing device according to claim 8, wherein the base is ceramic.

13. A surface-mount pointing device according to claim 8, wherein the base is a printed circuit board.

14. A surface-mount pointing device according to claim 8, wherein the device is mounted in a keyboard.

* * * * *